United States Patent
Ahn et al.

(10) Patent No.: US 11,259,326 B2
(45) Date of Patent: Feb. 22, 2022

(54) METHOD AND DEVICE FOR PERFORMING RANDOM ACCESS PROCESS IN UNLICENSED BAND

(71) Applicant: LG ELECTRONICS INC., Seoul (KR)

(72) Inventors: Joonkui Ahn, Seoul (KR); Byounghoon Kim, Seoul (KR); Suckchel Yang, Seoul (KR); Yunjung Yi, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 16/997,892

(22) Filed: Aug. 19, 2020

(65) Prior Publication Data

US 2020/0383142 A1 Dec. 3, 2020

Related U.S. Application Data

(63) Continuation of application No. 16/698,803, filed on Nov. 27, 2019, now Pat. No. 10,779,327, which is a
(Continued)

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 56/00* (2013.01);
(Continued)

(58) Field of Classification Search
CPC ... H04W 28/04; H04W 72/04; H04W 72/042; H04W 88/08; H04W 74/0808;
(Continued)

(56) References Cited

U.S. PATENT DOCUMENTS 10,499,427 B2 * 12/2019 Hampel ............ H04W 74/0816
10,548,167 B2 * 1/2020 Ahn .................. H04W 56/0045
(Continued)

FOREIGN PATENT DOCUMENTS

| CN | 101132618 | 2/2008 |
|---|---|---|
| WO | 2010104977 | 9/2010 |

OTHER PUBLICATIONS

European Patent Office Application No. 16793031.2, Office Action dated Sep. 9, 2019, 6 pages.
(Continued)

*Primary Examiner* — Phuongchau Ba Nguyen
(74) *Attorney, Agent, or Firm* — Lee Hong Degerman Kang & Waimey

(57) ABSTRACT

Provided are a method for performing a random access process in an unlicensed band, and a device using the same. The device receives a random access preamble (RAP) order instructing the transmission of a RAP. The device performs a clear channel assessment (CCA) in an unlicensed cell during an RAP window so as to transmit the RAP when the device succeeds in CCA.

8 Claims, 9 Drawing Sheets

Related U.S. Application Data continuation of application No. 15/571,453, filed as application No. PCT/KR2016/005075 on May 13, 2016, now Pat. No. 10,548,167.

(60) Provisional application No. 62/313,818, filed on Mar. 28, 2016, provisional application No. 62/288,446, filed on Jan. 29, 2016, provisional application No. 62/161,223, filed on May 13, 2015.

(51) Int. Cl.
*H04W 56/00* (2009.01)
*H04W 16/14* (2009.01)

(52) U.S. Cl.
CPC ..... *H04W 56/001* (2013.01); *H04W 56/0045* (2013.01); *H04W 74/08* (2013.01)

(58) Field of Classification Search
CPC ..... H04W 74/08; H04W 56/00; H04W 16/14; H04W 56/001; H04W 56/0045; H04L 5/0007

See application file for complete search history.

(56) References Cited

U.S. PATENT DOCUMENTS

| | | | |
|---|---|---|---|
| 10,568,050 B2* | 2/2020 | Jeon | H04W 74/0833 |
| 10,568,141 B2 | 2/2020 | Ahn et al. | |
| 10,779,327 B2* | 9/2020 | Ahn | H04W 56/001 |
| 10,848,977 B2* | 11/2020 | Babaei | H04W 16/14 |
| 10,893,543 B2* | 1/2021 | Li | H04W 72/042 |
| 10,925,093 B2* | 2/2021 | Jose | H04W 72/02 |
| 11,057,885 B2* | 7/2021 | Yerramalli | H04W 74/0808 |
| 11,064,533 B2* | 7/2021 | Agiwal | H04W 72/042 |
| 2013/0012134 A1 | 1/2013 | Jin et al. | |
| 2014/0321437 A1 | 10/2014 | Wong et al. | |
| 2014/0341035 A1 | 11/2014 | Bhushan et al. | |
| 2015/0049712 A1 | 2/2015 | Chen et al. | |
| 2015/0049741 A1* | 2/2015 | Chen | H04W 16/14 370/336 |
| 2015/0057008 A1* | 2/2015 | Seok | H04L 5/0092 455/452.1 |
| 2015/0057011 A1 | 2/2015 | Girolamo et al. | |
| 2015/0085794 A1 | 3/2015 | Chen et al. | |
| 2015/0099525 A1 | 4/2015 | Ji et al. | |
| 2016/0234861 A1 | 8/2016 | Ye et al. | |
| 2016/0270121 A1 | 9/2016 | Bergstrom et al. | |
| 2017/0231011 A1* | 8/2017 | Park | H04W 74/006 |
| 2019/0159249 A1 | 5/2019 | Ahn et al. | |
| 2020/0100287 A1 | 3/2020 | Ahn et al. | |

OTHER PUBLICATIONS

3GPP Standard; 3GPP TS 36.321 V11.6.0 (Mar. 2015), Valbonne, France, 57 pages.
U.S. Appl. No. 16/698,803, Office Action dated Feb. 4, 2020, 39 pages.
U.S. Appl. No. 15/571,453, Office Action dated Apr. 11, 2019, 23 pages.
PCT International Application No. PCT/KR2016/005075, International Search Report dated Aug. 4, 2016, 2 pages.
Chinese application No. 201680027304.4, Office Action dated Nov. 7, 2019, 6 pages.
European Patent Office Application Serial No. 16793031.2, Search Report dated Dec. 19, 2018, 7 pages.

* cited by examiner

METHOD AND DEVICE FOR PERFORMING RANDOM ACCESS PROCESS IN UNLICENSED BAND

CROSS-REFERENCE TO RELATED APPLICATIONS

This application is a continuation of U.S. patent application Ser. No. 16/698,803, filed on Nov. 27, 2019, which is the continuation of U.S. patent application Ser. No. 15/571,453, filed on Nov. 2, 2017, now U.S. Pat. No. 10,548,167, which is the National Stage filing under 35 U.S.C. 371 of International Application No. PCT/KR2016/005075, filed on May 13, 2016, which claims the benefit of U.S. Provisional Applications No. 62/161,223, filed on May 13, 2015, 62/288,446, filed on Jan. 29, 2016 and 62/313,818, filed on Mar. 28, 2016, the contents of which are all hereby incorporated by reference herein in their entirety.

BACKGROUND OF THE INVENTION

Field of the Invention

The present invention relates to wireless communication, and more particularly, to a method of performing a random access process in an unlicensed band, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

At present, an LTE-UE supports only downlink transmission in the unlicensed band. However, in order to provide more various services, there is a need to consider uplink transmission.

SUMMARY OF THE INVENTION

The present invention provides a method of performing a random access process in an unlicensed band, and a device using the method.

In an aspect, a method for performing a random access process in an unlicensed band is provided. The method includes receiving, by a wireless device, a random access preamble (RAP) order instructing a transmission of an RAP, performing, by the wireless device, clear channel assessment (CCA) during an RAP window in an unlicensed cell, and if the CCA is successful, transmitting the RAP.

The method may further includes receiving, by the wireless device, a random access response (RAR) comprising a timing advance command (TAC) in response to the RAP, and adjusting, by the wireless device, uplink (UL) time alignment in the unlicensed cell based on the TAC and a time point at which the RAP is transmitted.

In another aspect, a device for performing a random access process in an unlicensed band includes a transceiver configured to transmit and receive a radio signal, and a processor operatively coupled to the transceiver. The processor is configured to instruct the transceiver to receive a random access preamble (RAP) order instructing a transmission of an RAP, instruct the transceiver to perform clear channel assessment (CCA) during an RAP window in an unlicensed cell, and instruct the transceiver to transmit the RAP if the CCA is successful.

A random access process for uplink transmission can be performed in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc.

The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
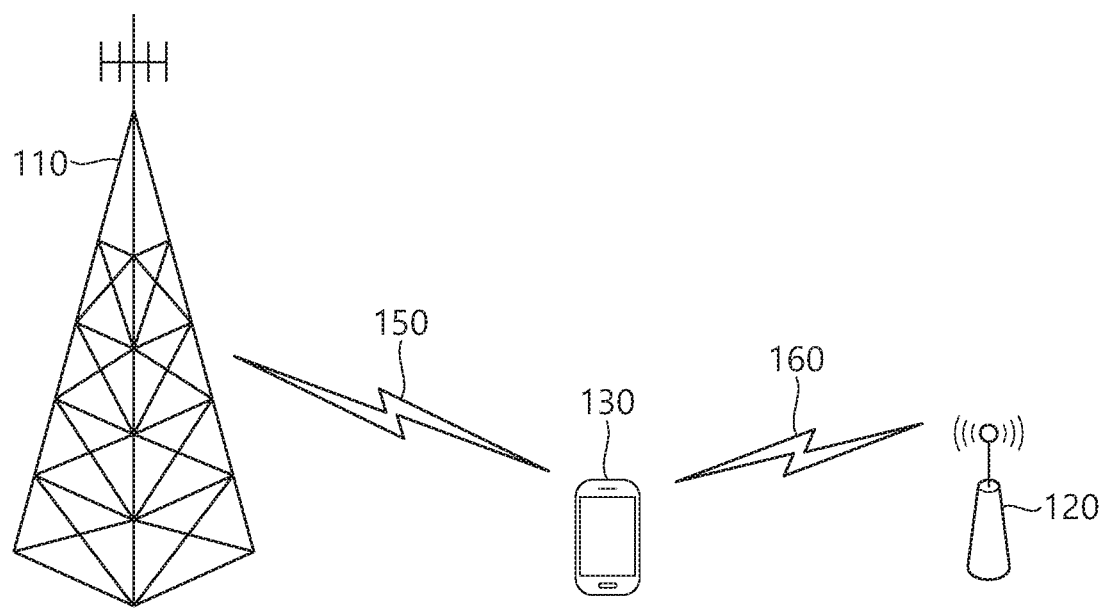
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For UL traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell or an unlicensed carrier. A cell operating in a licensed band is called a licensed cell or a licensed carrier.

An LBT operation in an unlicensed band is regulated in some countries. For example, in Europe, there are two types of LBT operations which are named as frame based equipment (FBE) and load based equipment (LBE).

Figure 2:
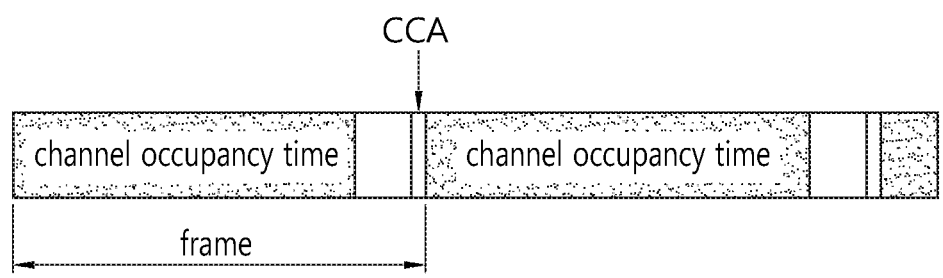
FIG. 2 shows an example of a frame based equipment (FBE)-based listen before talk (LBT) operation.

FIG. 2 shows an example of an FBE-based LBT operation.

A channel occupancy time implies a time during which transmission can be continued when a communication node successfully accesses a channel, and has a value of about 1 ms to 10 ms. A frame is an idle time corresponding to at least 5% of the channel occupancy time. CCA is defined as an operation of observing the channel during at least 20 μs before an end portion within the idle time. The communication node periodically performs the CCA in unit of the frame, and transmits data during a next channel occupancy time in a state where the channel is not occupied. The communication node defers transmission in a state where the channel is occupied, and waits until a next frame.

The FBE-based LBT operation implies that a channel occupancy time and a channel detection time are predefined, and CCA is performed only at a determined channel detection time, and may be called a fixed CCA execution method.

Figure 3:
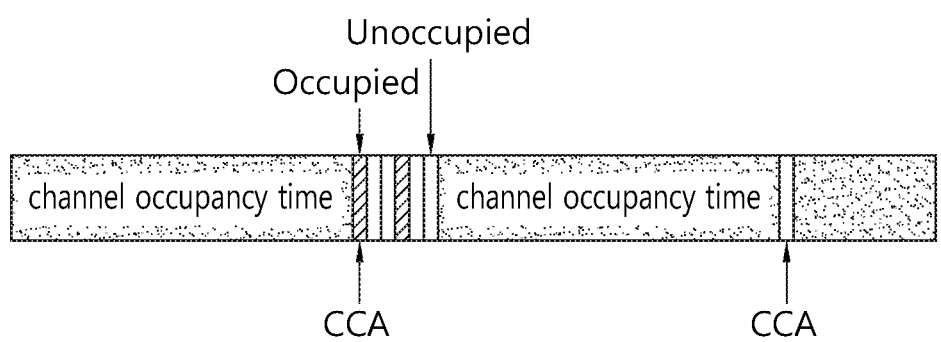
FIG. 3 shows an example of a load based equipment (LBE)-based LBT operation.

FIG. 3 shows an example of an LBE-based LBT operation.

An idle time is defined between channel occupancy times. The idle time is divided into a plurality of slots. A communication node may first set a value of $q \in \{4, 5, \ldots, 32\}$ and thereafter perform CCA for one slot, and if a channel is in an unoccupied state in the CCA slot, may transmit data by ensuring a channel occupancy time having a length of (13/32)q ms. If the channel is in an occupied state in the first CCA slot, the communication node randomly chooses a value of $N \in \{1, 2, \ldots, q\}$ and stores it as an initial value of a backoff counter. Thereafter, if the channel is in the unoccupied state in one CA slot while sensing a channel state in unit of the CCA slot, a value of the backoff counter is decreased by 1. If the value of the backoff counter becomes 0, the communication node may transmit data during the channel occupancy time having the length of (13/32)q ms.

The LBE-based LBT operation implies that the communication node performs the CCA by randomly determining a channel detection time (e.g., the CCA slot) according to whether the channel is occupied, and may be called a random CCA execution method.

Hereinafter, a parameter for selecting an LBT method and determining a backoff length, a parameter for determining a size of a CCA slot, and a parameter used for an LBT operation such as a period and time offset for determining CCA timing are called an LBT parameter. A unit of signals transmitted by a radio node through an LBT operation performed one time is called a transmission burst.

Figure 4:
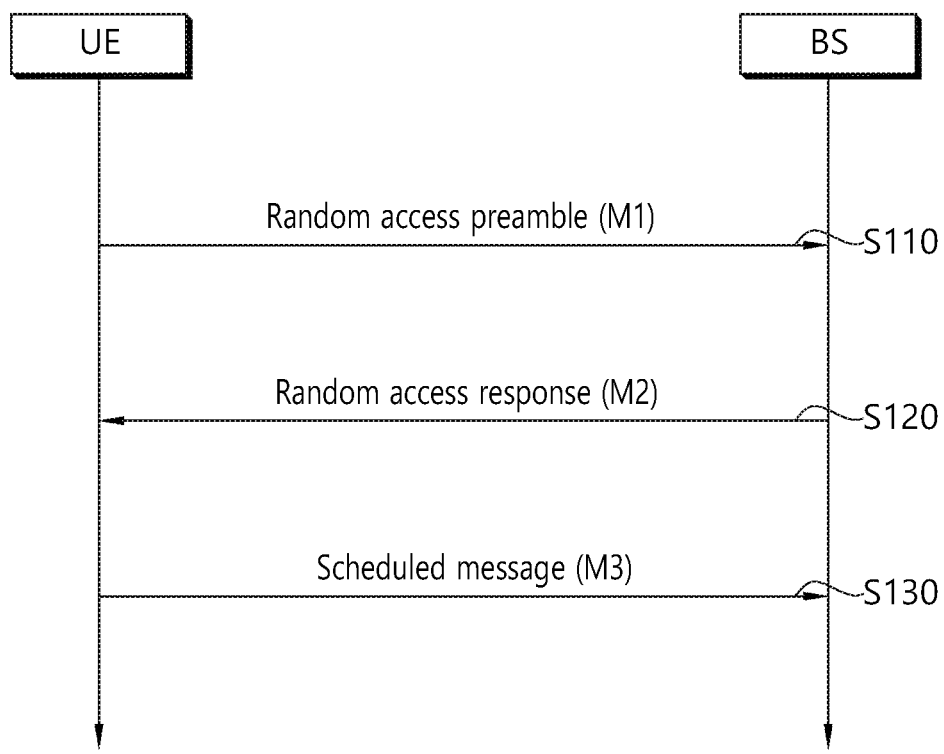
FIG. 4 is a flowchart showing a random access process according to the conventional technique.

FIG. 4 is a flowchart showing a random access process according to the conventional technique. The random access process is used by a UE for UL synchronization acquisition or UL radio resource allocation.

A UE receives a root index and a physical random access channel (PRACH) configuration index from a BS. Each cell has 64 candidate random access preambles defined by a Zadoff-Chu (ZC) sequence. The root index is a logical index for generating the 64 candidate random access preambles by the UE.

The random access preamble is limited to a specific time and frequency resource for each cell. The PRACH configuration index indicates a specific subframe and preamble format capable of transmitting the random access preamble.

The UE transmits a randomly selected random access preamble to the BS (S110). The UE selects one of the 64 candidate random access preambles. In addition, the UE selects a corresponding subframe by using the PRACH configuration index. The UE transmits the selected random access preamble in the selected subframe.

Upon receiving the random access preamble, the BS transmits a random access response (RAR) to the UE (S120). The RAR is detected in two steps. First, the UE detects a PDCCH masked with a random access-RNTI (RA-RNTI). The UE receives the RAR included in a medium access control (MAC) protocol data unit (PDU) through a PDSCH indicated by the detected PDCCH.

The RAR may include a timing advance command (TAC), a UL grant, and a temporary C-RNTI. The TAC is information indicating a time alignment value sent by a BS to a UE to maintain a UL time alignment. The UE updates UL transmission timing by using the time alignment value.

When the UE updates the time alignment, a time alignment timer starts or restarts. The UE can perform a UL transmission only when the time alignment timer is running.

Upon receiving the random access response, the UE transmits a scheduled message to the BS according to a UL grant included in the RAR (S130).

Meanwhile, a random access preamble (RAP) may be transmitted to confirm a UL synchronization and UL channel state of each UE also in an unlicensed band. A method of transmitting the RAP in the unlicensed band is proposed.

Hereinafter, a radio frame includes 10 subframes. One subframe may include a plurality of orthogonal frequency division multiplexing (OFDM) symbols in a time region. A time required to transmit one subframe is called a transmission time interval (TTI). For example, 1 TTI may be 1 ms. The OFDM symbol is only for expressing one symbol period in the time region, and there is no limitation in a multiple access scheme or terminologies. For example, the OFDM symbol may also be referred to as another terminology such as a single carrier-frequency division multiple access (SC-FDMA) symbol, a symbol period, etc.

Figure 5:
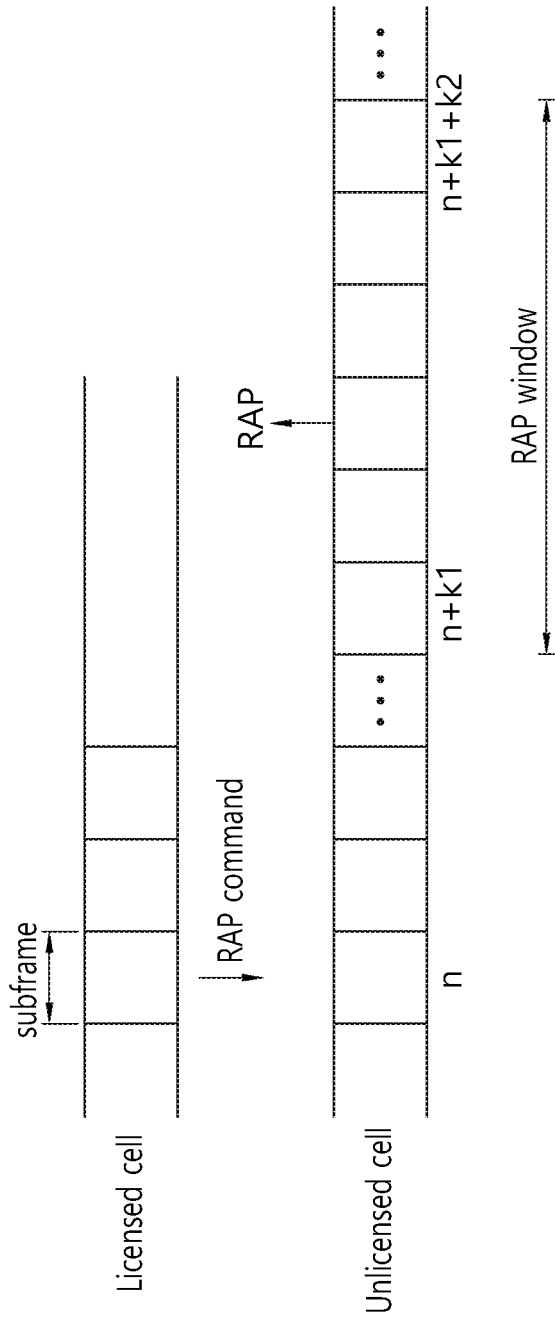
FIG. 5 shows a random access method according to an embodiment of the present invention.

FIG. 5 shows a random access method according to an embodiment of the present invention.

A BS transmits to a UE an RAP order for instructing RAP transmission in an unlicensed cell. The RAP order may be transmitted in a licensed cell (e.g., a primary cell), or may be transmitted in an unlicensed cell (e.g., a secondary cell).

The RAP order may be instructed by downlink control information (DCI) transmitted through a DL control channel (e.g., a PDCCH or an EPDCCH). In the unlicensed cell, whether the UE will transmit an RAP at any time point depends on a CCA result. In order for the UE to increase an opportunity of transmitting the RAP, the RAP order may include information regarding a time/frequency region in which the UE can transmit the RAP.

The following table exemplifies information included in the RAP order. Not all information is essential, and thus another information may be added and some information may be omitted.

TABLE 1

| Field name | Description |
| --- | --- |
| Cell index | This indicates an unlicensed cell in which an RAP will be transmitted, and may be omitted when an RAP order is transmitted in the unlicensed cell. |
| RAP resource | This indicates a preamble index and/or frequency resource for an RAP. |
| RAP window | This indicates a start point and/or size of an RAP window in which transmission of an RAP will be attempted. |

The RAP window may include successive subframes in which the RAP will be transmitted. For example, if the RAP order is received in a subframe n, a subframe n+k1 to a subframe n+k1+k2 may correspond to the RAP window. 'k1' may be a start time of the RAP window, and 'k2' may be a length of the RAP window. The RAP order may include information regarding k1 and k2. The UE may perform CCA from the subframe n+k1, and may transmit the RAP when an RAP resource is idle.

Information regarding the RAP resource and the RAP window may be predetermined or may be configured through an additional message (e.g., a radio resource control (RRC) message), instead of the RAP order.

A plurality of RAP resources may be configured within one RAP window. When the subframe n+k1 to the subframe n+k1+k2 correspond to the RAP window, the UE may use RAP resources starting from an RAP resource closest to the subframe n+k1 in RAP transmission. Alternatively, it is assumed that the number of RAP resources is 'r1'. The UE may use r1 RAP resources starting from the RAP resource closest to the subframe n+k1. It is assumed that the number of subframes in which the RAP resource is configured is 'r2'. The UE may use r2 subframes starting from the subframe n+k1 in RAP transmission. Alternatively, the RAP order may designate one of the plurality of RAP windows and/or one of the plurality of RAP resources.

The UE may transmit the RAP only one time in the RAP window, or even if RAP transmission is successful, may re-attempt RAP transmission by repeating the CCA. The UE may transmit the RAP multiple times during the RAP window.

A DL control channel for carrying the RAP order may be transmitted in the unlicensed cell. In order for this DL control channel to have a higher transmission priority, a shorter backoff counter or a smaller CCA slot may be applied in comparison with other channels. Alternatively, a CCA threshold to be applied to CCA of the RAP order may use a higher value in comparison with other channels.

The UE which has received the RAP order performs CCA during the RAP window, and if a channel is idle, transmits the RAP.

When performing the CCA for the RAP, it may be determined that the CCA is successful if a shorter maximum backoff counter is configured in comparison with other UL channels, or if the CCA is successful even only one time during a short CCA slot. Alternatively, the CCA threshold to be applied to RAP transmission may use a higher value in comparison with other UL channels.

The UE may perform the CCA only for a frequency region assigned to RAP transmission during the RAP window.

A subframe designated for a specific usage may be excluded from the RAP window. The RAP window may include a subframe excluding a subframe which cannot be used in UL transmission or RAP transmission (e.g., a duration designated for transmission of a DL discovery reference signal (DRS)).

If an RAP transmission duration corresponds to n OFDM symbols in a subframe, RAP transmission may be limited to last n OFDM symbols in the subframe for the CCA operation.

The following operation is possible for an exact time point at which the UE can transmit the RAP.

In one exemplary embodiment, a time point at which the UE can start RAP transmission may be limited only to a boundary of a subframe or a boundary of an OFDM symbol. This is called a limited RAP transmission scheme. The UE may transmit a reservation signal defined separately from the RAP in order to occupy a channel between time points at which RAP transmission is allowed after CCA is successful.

In another embodiment, the UE may start RAP transmission at any time point at which the CCA operation is complete within a given time duration. This is called a random RAP transmission method. Since the BS cannot know an RAP transmission time point of the UE, the UE and the BS need to share a predefined reference time point.

Figure 6:
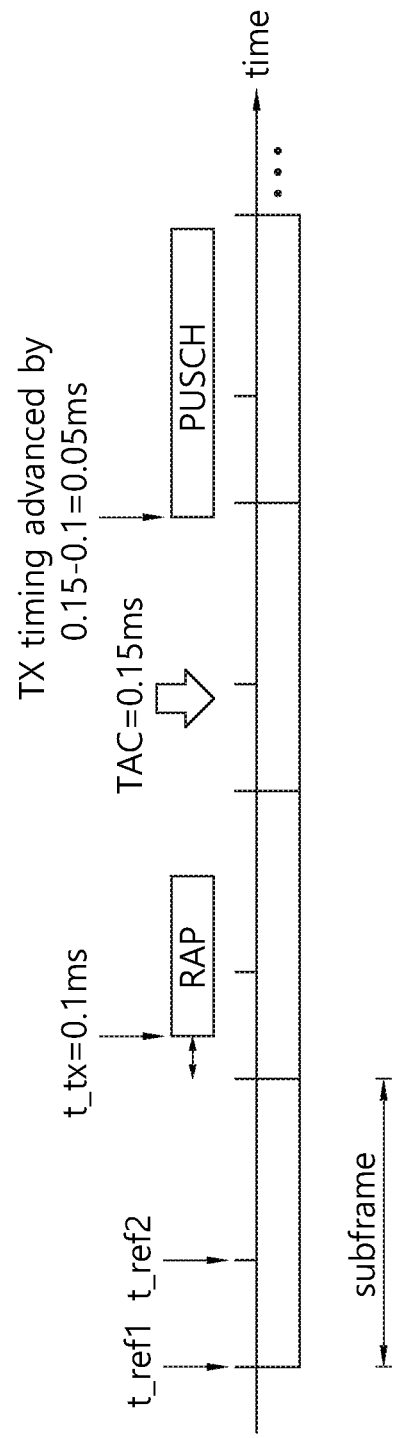
FIG. 6 shows an example of a random RAP transmission scheme.

FIG. 6 shows an example of a random RAP transmission scheme.

It is assumed that a subframe has a length of 1 ms, and a reference time point is given in unit of subframes. It is assumed that two reference time points t_ref1 and t_ref2 are defined in one subframe. The number of reference time points and positions thereof are for exemplary purposes only.

CCA is successful after t_ref1, and thus a UE transmits an RAP. An offset t_tx is defined between a reference time point and a time at which the RAP is actually transmitted. It is assumed that t_tx=0.1 ms. Thereafter, the UE receives TAC for correcting a UL transmission time from a BS. The BS calculates the TAC by regarding that the UE transmits the RAP at the reference time point, and thus the UE can correct the TAC by using the offset. If the TAC is 0.15 ms, a time alignment value used actually by the UE in UL transmission is TAC-t_tx=0.05 ms. That is, even if the BS instructs to advance UL transmission timing by the TAC, the UE advances the UL transmission timing by TAC-t_tx.

Figure 7:
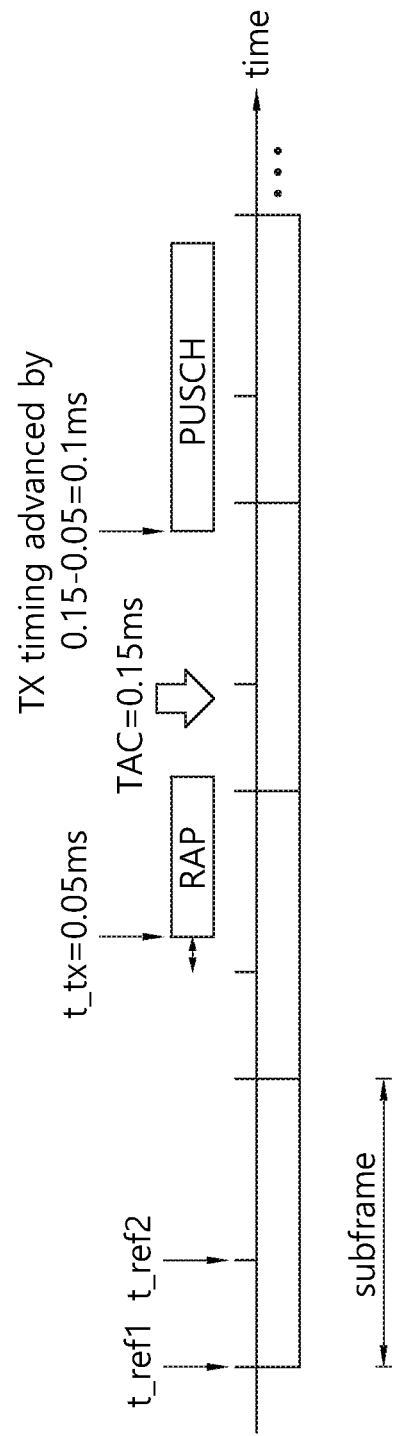
FIG. 7 shows another example of a random RAP transmission scheme.

FIG. 7 shows another example of a random RAP transmission scheme.

CCA is successful after t_ref2, and thus a UE transmits an RAP. It is assumed that an offset between a reference time point and a time at which the RAP is actually transmitted is t_tx=0.05 ms. Thereafter, the UE receives TAC for correcting a UL transmission time from a BS. If the TAC is 0.15 ms, a time alignment value used actually by the UE in UL transmission is TAC-t_tx=0.1 ms.

A plurality of reference time points may be defined within an RAP window. In order for the BS to be able to identify specific reference time points when a time point at which the UE transmits the RAP exists between the specific reference time points, a time point at which the UE can transmit the RAP may be limited to a certain duration between two reference time points.

A limited RAP transmission scheme and a random RAP transmission scheme may be combined. One or more time durations in which the UE can start RAP transmission in the RAP window is determined, and the random RAP transmission scheme is applied in a corresponding time duration.

Which one will be applied between the limited RAP transmission scheme and the random RAP transmission scheme may be informed to the UE by the BS through an RAP order or an RRC message.

The UE may fail to transmit the RAP due to a failure in CCA during the RAP window. In this case, the UE may re-attempt RAP transmission or may declare a failure in the RAP transmission.

Figure 8:
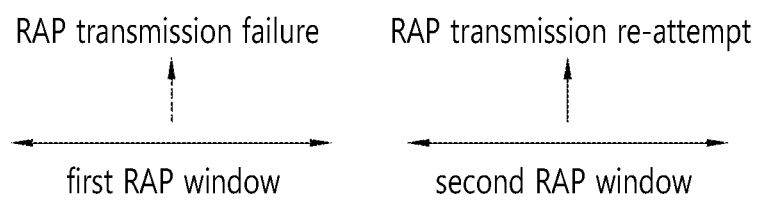
FIG. 8 shows one example of an RAP transmission re-attempt.

FIG. 8 shows one example of an RAP transmission re-attempt.

If a channel is busy during a first RAP window and thus RAP transmission fails, a UE attempts RAP transmission during a second RAP window. The second RAP window may be consecutive with the first RAP window or may appear after a time offset t_wait. The time offset t_wait may be predetermined or randomly acquired value. A size of an i-th RAP window may be predetermined or may be increased or decreased according to a specific rule.

If the RAP is not transmitted due to a failure in CCA, transmit power of the RAP to be retransmitted is not increased. If the RAP window is applied, RAP transmit power may be set identically in all RAP windows. That is, even if the RAP is not transmitted due to a failure in the CCA in the first RAP window and thus RAP transmission is performed in the second RAP window, the RAP transmit power is not increased. This is to maintain constant transmit power so that other nodes performing the CCA can detect the RAP within certain coverage. However, even if the RAP is transmitted in a previous RAP window, the RAP may not be received, and thus RAP transmit power may be increased when retransmission of the RAP is attempted in a next RAP window.

If the CCA threshold is defined to be inverse proportional to the RAP transmit power, transmit power of the next RAP window may be decreased to be lower than transmit power of the previous RAP window in order to avoid a continuous RAP transmission failure caused by a CCA failure.

If the CCA is not successful during one or more RAP windows, the UE may discard RAP transmission. Alternatively, the UE may discard RAP transmission in case of a failure in reception of an RAR to be described below. If the RAP transmission is discarded, the UE may transmit information regarding a reason of discarding to the BS. This information may be transmitted from a licensed cell or an unlicensed cell through an RRC message or the like. If it is possible to distinguish whether the RAP transmission is discarded due to a failure in CCA or whether the RAP is transmitted but RAR reception fails, it may be useful to determine whether the BS will instruct again an RAP order in a corresponding unlicensed cell. In addition, if the UE fails in RAP transmission due to incompletion of the CCA operation during a given time duration, measurement information (e.g., reference signal received power (RSRP)/received signal strength indicator (RSSI)/interference information, etc.) regarding a corresponding unlicensed cell may be provided to the BS.

The UE may provide the BS with the number of CCA attempts for RAP transmission, the number of times of transmitting the RAP due to successful CCA transmission, or statistics on a ratio thereof. The statistics may be transmitted in the license cell.

Now, RAR reception will be described.

After transmitting an RAP in an unlicensed cell, a UE attempts RAR reception from a BS during a random access response (RAR) reception duration. The RAR may be received in the unlicensed cell or may be received in a cell in which an RAP order is received.

If the RAR is transmitted in the unlicensed cell, a backoff counter for the RAR may be shorter in comparison with other cells. In addition, a CCA slot for the RAR may be shorter in comparison with other channels. A CCA threshold to be applied to RAR transmission may use a higher value in comparison with other channels.

If the RAR is not received during an RAR reception duration, the UE may attempt RAP retransmission, or may stop the RAP transmission attempt. If the RAR is not received through RRC signaling or the RAP order, the BS may determine whether to attempt RAP retransmission or stop the RAP transmission attempt.

If the RAR is transmitted in the unlicensed cell, a longer time may be required in comparison with RAR transmission without CCA. Therefore, the RAR reception duration in the unlicensed cell may be set to be greater than the RAR reception duration in the licensed cell.

The RAR may include at least one of resource allocation for UL transmission, TAC for correcting time alignment, and transmit power correction for adjusting UL transmit power. If a physical uplink shared channel (PUSCH) is scheduled by the RAR, the UE may transmit a PUSCH by correcting the UL transmit power and/or by applying the TAC. The PUSCH may be transmitted in the unlicensed cell, which implies that the PUSCH is transmitted after the CCA is complete. Alternatively, the PUSCH may be transmitted in the licensed cell (e.g., a primary cell) without CCA. This is to prevent the PUSCH from not being able to be transmitted due to a failure in the CCA. The RAR may include information indicating a cell in which the PUSCH will be transmitted. The TAC and/or the UL transmit power correction within the RAR may be applied only when the PUSCH is transmitted in the unlicensed cell.

A redundancy version (RV) and an HARQ process number for the PUSCH transmitted in response to the RAR may be designated as a predetermined value. An HARQ process number 0 (i.e., a first HARQ process number) and an RV 0 (i.e., an RV including a coding bit having systematic information) may be used under the assumption that the PUSCH transmission corresponds to initial transmission.

If UL transmission in the unlicensed cell is scheduled, the RAR may include LBT information regarding an LBT parameter (a CCA threshold, a backoff counter, etc.) to be applied to UL transmission. Content of the RAR may differ depending on whether the RAR is a response for RAP transmission in the licensed cell or a response for RAP transmission in the unlicensed cell. Alternatively, the response for RAP transmission in the licensed cell and the response for RAP transmission in the unlicensed cell may be multiplexed in one RAR. The RAR may include an identifier for indicating whether the RAR is the response for RAP transmission in the licensed cell or the response for RAP transmission in the unlicensed cell.

Regarding PUSCH transmission in the unlicensed cell, whether transmission is possible may be uncertain or may be significantly delayed depending on a CCA result, and thus the UE may not transmit a PUSCH. The RAR may include information indicating whether to transmit the PUSCH corresponding to the RAR. If PUSCH transmission is disabled, the RAR may not include UL transmission resource allocation. If the PUSCH transmission is disabled, the UE may transmit a confirmation signal for informing the BS of RAR reception. This confirmation signal may be a signal corresponding to HARQ ACK.

Figure 9:
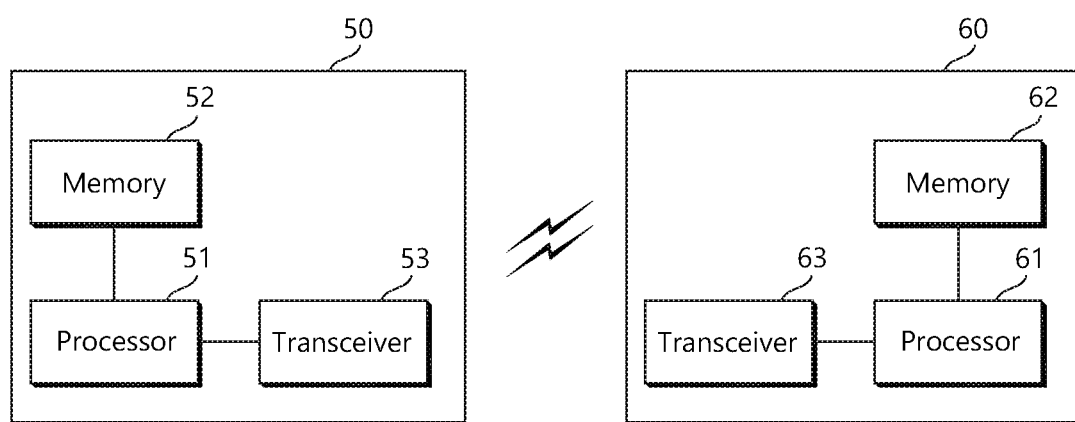
FIG. 9 is a block diagram showing a wireless communication system according to an embodiment of the present invention.

FIG. 9 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a random access procedure in an unlicensed band, the method performed by a wireless device and comprising:
    performing a listen before talk (LBT) in an unlicensed band to check whether the LBT is failed or not;
    based on the LBT being not failed, transmitting a first random access preamble with a first transmit power in the unlicensed band; and
    attempting to transmit a second random access preamble in the unlicensed band,
    wherein attempting to transmit the second random access preamble comprises:
    based on the LBT being failed, attempting to transmit the second random access preamble with a second transmit power in the unlicensed band, the second transmit power having a same value with the first transmit power, and
    based on the LBT being not failed, attempting to transmit the second random access preamble with a third transmit power in the unlicensed band, the third transmit power having a greater value than the first transmit power.

2. The method of claim 1, wherein performing the LBT in an unlicensed band comprises:
    sensing a channel during a channel detection time which is randomly selected by the wireless device;
    determining that the LBT being not failed based on the channel being sensed to be idle during the channel detection time; and
    determining that the LBT being failed based on the channel being sensed not to be idle during the channel detection time.

3. The method of claim 1, further comprising:
    receiving a random access response as a response to the first random access preamble or the second random access preamble, the random access response including an uplink resource allocation assigned to a transmission of a scheduled message and a LBT parameter to be applied to a LBT operation for the transmission of the scheduled message.

4. The method of claim 3, wherein:
    based on the LBT parameter indicating a first LBT scheme, the scheduled message is transmitted by the wireless device after a channel is sensed to be idle for a predefined time, and
    based on the LBT parameter indicating a second LBT scheme, the scheduled message is transmitted by the wireless device after the channel is sensed to be idle for a channel detection time which is randomly selected by the wireless device.

5. A device comprising:
    a processor; and
    a memory operatively coupled with the processor and configured to store instructions that, when executed by the processor, cause the device to perform functions comprising:
    performing a listen before talk (LBT) in an unlicensed band to check whether the LBT is failed or not;
    based on the LBT being not failed, transmitting a first random access preamble with a first transmit power in the unlicensed band; and
    attempting to transmit a second random access preamble in the unlicensed band,
    wherein attempting to transmit the second random access preamble comprises:
    based on the LBT being failed, attempting to transmit the second random access preamble with a second transmit power in the unlicensed band, the second transmit power having a same value with the first transmit power, and
    based on the LBT being not failed, attempting to transmit the second random access preamble with a third transmit power in the unlicensed band, the third transmit power having a greater value than the first transmit power.

6. The device of claim 5, wherein performing the LBT in an unlicensed band comprises:
    sensing a channel during a channel detection time which is randomly selected by the wireless device;
    determining that the LBT being not failed based on the channel being sensed to be idle during the channel detection time; and
    determining that the LBT being failed based on the channel being sensed not to be idle during the channel detection time.

7. The device of claim 5, wherein the functions further comprise:
    receiving a random access response as a response to the first random access preamble or the second random access preamble, the random access response including an uplink resource allocation assigned to a transmission of a scheduled message and a LBT parameter to be applied to a LBT operation for the transmission of the scheduled message.

8. The device of claim 7, wherein:
    based on the LBT parameter indicating a first LBT scheme, the scheduled message is transmitted by the device after a channel is sensed to be idle for a predefined time, and
    based on the LBT parameter indicating a second LBT scheme, the scheduled message is transmitted by the device after the channel is sensed to be idle for a channel detection time which is randomly selected by the device.

* * * * *